United States Patent [19]
Creger

[11] Patent Number: 5,848,371
[45] Date of Patent: Dec. 8, 1998

[54] METHOD FOR DETERMINING AN ESTIMATE OF A DRIVELINE TORQUE USING A COMPUTER BASED MODEL

[75] Inventor: Todd D. Creger, Metamora, Ill.

[73] Assignee: Caterpillar Inc., Peoria, Ill.

[21] Appl. No.: 664,063

[22] Filed: Jun. 13, 1996

[51] Int. Cl.[6] .............................. G06F 19/00; B60K 41/06
[52] U.S. Cl. ............................ 701/101; 701/84; 701/102
[58] Field of Search .................................. 701/51, 50, 54, 701/53, 84, 87, 90, 93, 101, 102; 477/107, 109, 115, 118

[56] References Cited

U.S. PATENT DOCUMENTS

| | | | |
|---|---|---|---|
| 4,680,959 | 7/1987 | Henry et al. | 73/117 |
| 4,771,848 | 9/1988 | Namba et al. | 180/197 |
| 5,065,319 | 11/1991 | Iwatsuki et al. | 701/101 |
| 5,123,302 | 6/1992 | Brown et al. | 701/60 |
| 5,184,527 | 2/1993 | Nakamura | 477/110 |
| 5,377,112 | 12/1994 | Brown, Jr. et al. | 364/431.12 |
| 5,406,486 | 4/1995 | Kamio et al. | 701/84 |
| 5,452,207 | 9/1995 | Hrovat et al. | 701/1 |

*Primary Examiner*—Tan Q. Nguyen
*Attorney, Agent, or Firm*—James R. Yee; Byron G. Buck

[57] ABSTRACT

In one aspect of the present invention, a method for determining an estimate of a torque of a powertrain at a point M using a computer based model is provided. The powertrain includes a driveline and an engine. The method includes the steps of sensing a plurality of parameters of the powertrain in realtime during operation and responsively producing a plurality of respective parameter signals, and receiving the parameter signals, determining a modeled value of the torque, and responsively producing a torque signal.

4 Claims, 3 Drawing Sheets

Fig_1_

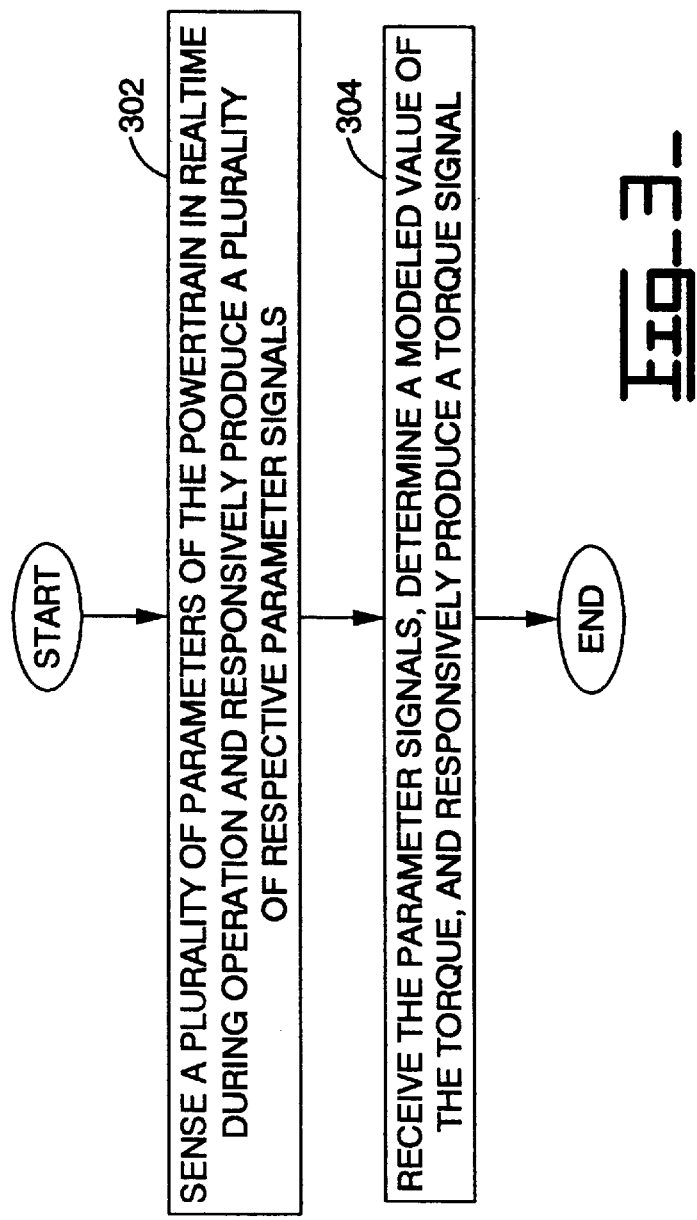

METHOD FOR DETERMINING AN ESTIMATE OF A DRIVELINE TORQUE USING A COMPUTER BASED MODEL

TECHNICAL FIELD

This invention relates generally to providing diagnostics to a powertrain, and more particularly, to a method for determining an estimate of a driveline torque using a computer based model.

BACKGROUND ART

Proper maintenance of a machine's powertrain system is an important priority in the daily operation of a vehicle. Without proper maintenance minor problems can escalate into major mechanical failures, resulting in costly downtime and expensive repairs.

One way to predict future problems is to measure and track various parameters of the engine and driveline. For example, engine oil temperature may be measured and monitored. If engine oil temperature exceeds a predetermined value then the occurrence can be logged and/or the operator can be notified to address the problem.

Another useful value to monitor is driveline torque. However, sensors which measure torque are costly and may be unreliable especially in extreme operating conditions.

The subject invention is directed at overcoming one or more of the problems as set forth above.

DISCLOSURE OF THE INVENTION

In one aspect of the present invention, a method for determining an estimate of a torque of a powertrain at a point M using a computer based model is provided. The powertrain includes a driveline and an engine. The method includes the steps of sensing a plurality of parameters of the powertrain in realtime during operation and responsively producing a plurality of respective parameter signals, and receiving the parameter signals, determining a modeled value of the torque, and responsively producing a torque signal.

BRIEF DESCRIPTION OF THE DRAWINGS

FIG. 3 is a flow diagram illustrating operation of the present invention.

BEST MODE FOR CARRYING OUT THE INVENTION

Figure 1:
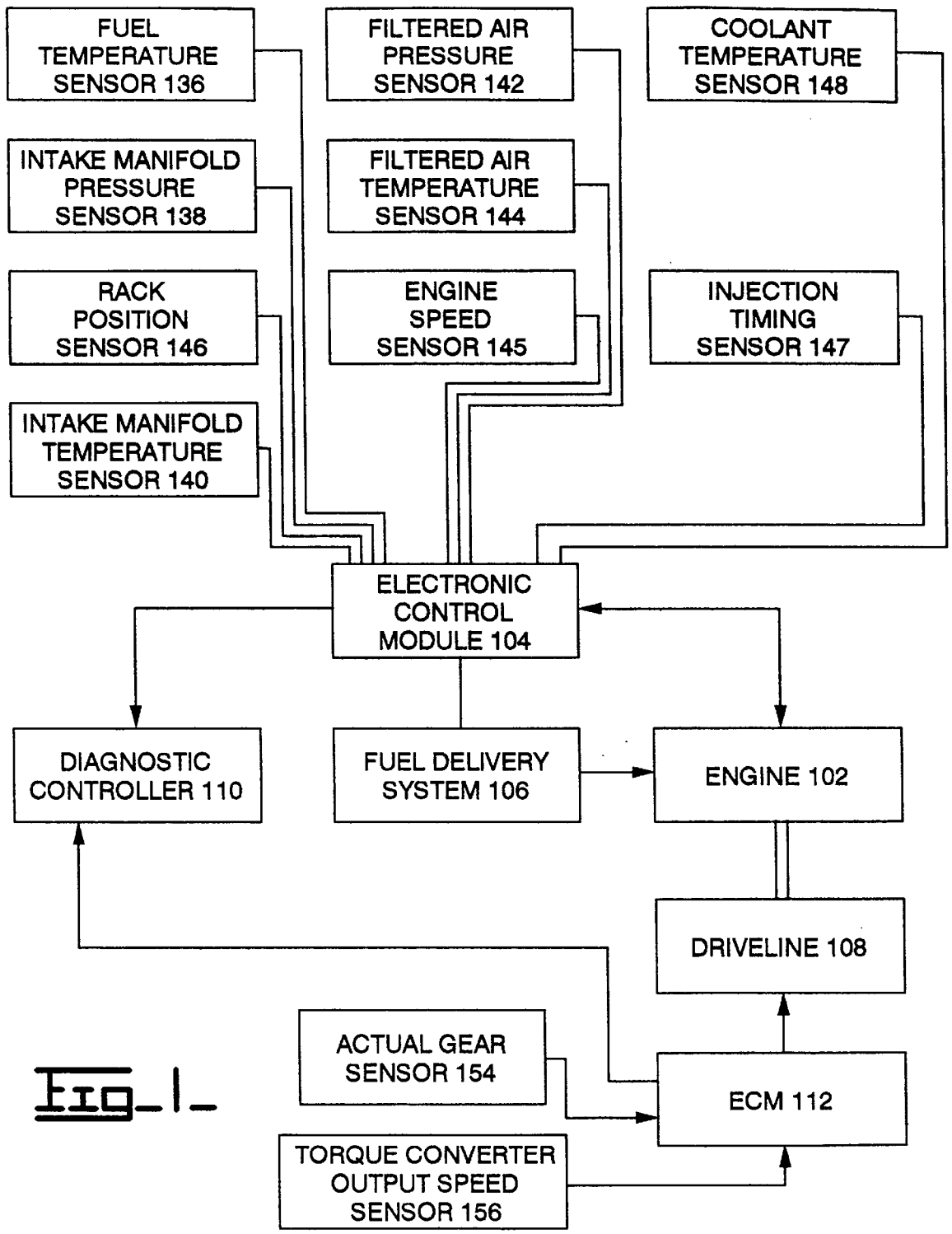
FIG. 1 is a block diagram of an apparatus for performing the present invention.

With reference to FIG. 1, the present invention is adapted to determine or model driveline torque values using computer based models.

An engine 102 is typically controlled by an electronic control module 104. The ECM 104 communicates with a fuel delivery system 106. Typically, the fuel delivery system 106 includes a mechanical fuel injection system or an electronic governor. The fuel delivery system 106 controls the amount of fuel delivered to the engine 102. The engine 102 drives a driveline 108.

A second ECM 112 controls transmission clutches in the driveline 108.

A diagnostic controller 110 receives powertrain information from both the ECM 104 and the second ECM 112 based on sensors connected to the engine 102 and driveline 108. The diagnostic controller 110 uses the engine information to calculate a driveline torque value as discussed below.

In the preferred embodiment, the diagnostic controller 110 receives information via the engine ECM 104 from a fuel temperature sensor 136, an intake manifold pressure (boost pressure) sensor 138, an intake manifold temperature sensor 140, a filtered air pressure sensor 142, and a filtered air temperature sensor 144. The diagnostic controller 110 also receives information from an engine speed sensor 145, a rack position sensor 146, an injection timing sensor 147, and a coolant temperature sensor 148.

The diagnostic controller 110 also receives information from an actual gear sensor 154 and a torque converter output speed sensor 156 as communicated by the driveline ECM 108.

Furthermore, the ECM 104 may also transmit other sensor information and other calculated engine parameters to the diagnostic controller 110. For example, the ECM 104 calculates the mass flow rate of fuel into the engine 102 as a function of engine speed (measured) and rack position or RACK. Note that the term RACK is used for historic purposes only. In engines controlled by an ECM, there is physically no rack. However, the term rack position (RACK) has been retained to refer to the amount of fuel delivered to the engine 102. The ECM 104 relays this information to the diagnostic controller 110. In the preferred embodiment, the ECM 104 also calculates an engine acceleration signal based on the engine speed signal and relays this information to the diagnostic controller 110.

In one embodiment, the diagnostic controller 110 includes a microprocessor capable of receiving the ECM information and performing the necessary diagnostic routines on board the vehicle.

In a second embodiment, the diagnostic controller 110 records or stores the ECM (sensed and calculated) information in a memory for download into an external computer for future analysis.

In a third embodiment, the diagnostic controller 110 includes a transmitter (not shown) for transmitting the data to a remote site for processing. A satellite system receives the signals from the transmitter and relays the signals to the remote site. One suitable transmitter is the Omnitracs Mobile Messaging Communications Terminal.

The diagnostic controller 110 receives the parameter information from engine and driveline and determines a modeled value of a driveline torque.

Figure 2:
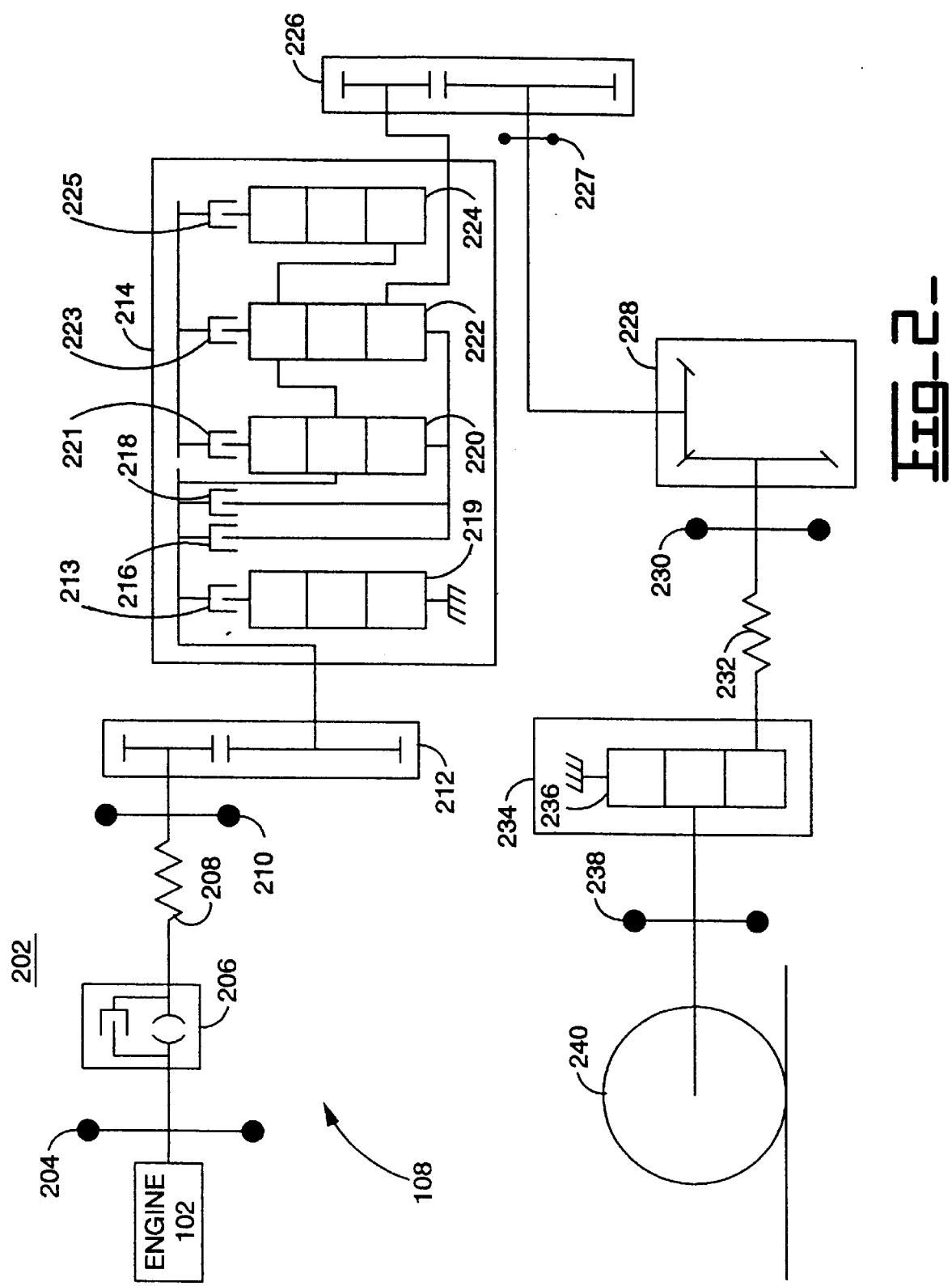
FIG. 2 is a diagrammatic illustration of a vehicle powertrain system.

With reference to FIG. 2, a mobile machine such as an earthmoving machine includes a powertrain 202 consisting of the engine 102 and driveline 108.

The engine 102 drives the driveline 108. A first inertia bar 204 represents the lumped rotating inertia at the output of the engine 102. This typically represents the flywheel inertia.

A torque converter 206 provides coupling between the engine 102 and a transmission 214. Preferably, the torque converter 206 includes a lock-up clutch.

Element 208 represents a torsional shaft stiffness between the torque converter and transmission. A second inertia bar 210 represents a second lumped driveline inertia. An input transfer gear 212 connects the torque converter 206 to the transmission 214.

In the preferred embodiment, the transmission 214 includes first, second, third, fourth, fifth, and sixth clutches 213, 216, 218, 221, 223, 225 and first, second, third, and fourth planetary gear sets 219, 220, 222, 224 to provide a plurality of forward and reverse gear ratios. Devices of this type are well known in the art and therefore are not further discussed.

An output transfer gear 226 couples the transmission 214 to a bevel gear differential 228. The bevel gear differential 228 delivers power to first and second wheels 240 (only one of which is shown) via a first and second final drives 234. While only the portion of the driveline between the bevel gear differential 228 and the first wheel 240 is illustrated and described below, the other portion of the driveline between the bevel gear differential 228 and the second wheel is identical.

A third inertia bar 227 represents the lumped driveline inertia between the transmission output and the bevel gear differential input. An element 232 represents the stiffness of the axle.

A fourth inertia bar 230 represents lumped rotating inertia between the bevel gear differential output and the first final drive 236.

The first final drive 234 includes a fifth planetary gear set 236.

A fifth inertia bar 238 represents the lumped rotating inertia between the first final drive 234 and wheel 240.

With reference to FIG. 3, the operation of the engine output torque model will be discussed. In a first control block 302, a plurality of parameters of the engine 102 are sensed in realtime during operation of the engine 102 and a plurality of respective parameter signals are produced.

In a second control block 304, the parameter signals are received (by the diagnostic controller 110), a modeled value of an output torque of the engine 102 is determined using a computer based model and a torque signal is responsively produced.

In the preferred embodiment, the engine output torque model uses the following engine information:

| | |
|---|---|
| engine speed | (SPEED), |
| timing advance | (TIMING), |
| rack position/fuel rate | (RACK), |
| intake manifold pressure | ($P_{intake}$), |
| inlet air temperature | ($T_a$), |
| intake manifold temperature | ($T_{intake}$), |
| inlet air pressure | ($P_{inlet}$), |
| coolant temperature | ($t_c$), and |
| fuel temperature | ($t_{fuel}$). |

The torque model first determines a modeled value of the brake power. A computer based model for determining a modeled value of the brake power is disclosed in U.S. Pat. No. 5,377,112 issued Dec. 27, 1994 to William L. Brown, Jr. et al. (BROWN), which is herein incorporated by reference. This is done by the following steps.

The volumetric efficiency of the engine 102 is calculated. The volumetric efficiency (VOL_EFF) is the mass flow efficiency of the engine 102 as it acts as a positive displacement pump. In the preferred embodiment, the volumetric efficiency of the engine 102 is obtained from an engine performance map. The engine performance map is empirically based and the volumetric efficiency is determined as a function of the rack position and the engine speed from the electronic control module 104.

The fuel to air ratio of the engine 102 is then calculated. In the preferred embodiment, calculating the fuel to air ratio (F/A) is determined by first determining the density of the air at the intake manifold and the mass flow of air to the engine 102. The density of the air is determined by:

$$d_{air} = P_{intake}/(R_{air} \cdot T_{intake}) \qquad \text{Equation 1}$$

where $R_{air}$ is the gas constant for air. Note that for $P_{intake}$, the measured value or a modeled value may be used. A computer based model of boost pressure is disclosed in BROWN.

Using the density of air calculated in Equation 1, the mass flow of air through the engine 102 is determined by:

$$\overline{m}_{air} = \text{VOL\_EFF} \cdot d_{air} \cdot \text{VOL\_FL\_RT} \qquad \text{Equation 2}$$

where VOL_FL_RT is the volumetric pumping of the engine and is determined by:

$$\text{VOL\_FL\_RT} = \frac{\text{DISPLACEMENT} \cdot \text{SPEED} \cdot 1 \text{ pump cycle}}{2 \text{ engine rev's} +} \qquad \text{Equation 3}$$

where DISPLACEMENT is the total displacement of the engine 102 and SPEED is the engine speed.

The mass fuel flow, $\overline{m}_{fuel}$ is received from the ECM 104. Preferably, the mass fuel flow is adjusted based on the temperature of the fuel, $t_{fuel}$. The fuel to air ratio is then determined by:

$$F/A = \overline{m}_{fuel}/\overline{m}_{air} \qquad \text{Equation 4}$$

The indicated power is then calculated. The indicated power represents the chemical energy delivered to the pistons. To determine the indicated power, first the indicated specific fuel consumption is determined. The indicated specific fuel consumption represents how efficiently fuel is being converted to indicated power. In the preferred embodiment, the indicated specific fuel consumption has units of mass/(indicated power * time), for example, kg/(W * sec) and is determined using a map. The map is determined experimentally and the indicated specific fuel consumption (ISFC) is found as a function of TIMING, RACK, SPEED, and F/A. TIMING is a signal indicative of the position of the flywheel in relation to "top dead center", at which fuel is injected into the engine. Preferably, TIMING is measured in degrees of the flywheel. TIMING, RACK, and SPEED are received from the ECM 104.

Second, the pumping power (PP) is determined. PP represents the work done by the engine 102 to pump fluids (gas) from intake to the exhaust manifold and is determined by:

$$PP = (P_{intake} - P_{ex} - (P_{intake} \cdot \text{SPEED}^2 \cdot K1)) \cdot \frac{\text{SPEED}^2 \cdot \text{DISPLACEMENT}}{2} \qquad \text{Equation 5A}$$

where K1 is an experimentally derived constant and $P_{ex}$ is the pressure of the exhaust gas at the exhaust manifold. In one embodiment, $P_{ex}$ is measured by a sensor (not shown). In another embodiment, $P_{ex}$ is calculated as a function of the mass fuel flow $\overline{m}_f$, mass air flow $\overline{m}_a$, inlet temperature, $T_a$, and turbine outlet pressure.

Third, the heat loss during the compression/expansion cycle (HIP) is determined by: Then, the indicated power can be determined by:

$$HIP = K2 \cdot (P_{intake} \cdot K3 + K4) \cdot (K5 \cdot (T_c + (T_{intake} - T_c) \cdot K6) - T_c) \cdot \frac{SPEED \cdot DISPLACEMENT}{T_2 \cdot ((T_c + (T_{intake} - T_c) \cdot K6) - K7)}$$

Equation 5C $$IP = \overline{m}_{fuel}/ISFc + PP + HIP$$

Equation 5C where K2–K7 are experimentally derived constants.

The parasitic power loss due to engine friction (mechanical losses) and other losses can be determined using a map of power loss versus engine speed. The brake power or the power available at the flywheel of the engine 102 can be determined by subtracting the friction power from the indicated power.

$$BP = IP - FP$$

Equation 6

After the brake power is determined, the net engine output torque is determined by the equation:

$$T_{ENG} = (BPl/SPEED) K_{ENG} - LOSSES$$

Equation 7 where $K_{ENG}$ is a predetermined constant and LOSSES includes parasitic losses and losses from any powertrain accessories, e.g., hydraulic systems, driven by the engine 102.

With reference to FIG. 3, the operation of the driveline torque estimation model will now be discussed.

The torque at an arbitrary point M ($T_M$) on the driveline is determined as the difference between the torque converter output torque $T_{TORQUE—CONVERTER—OUT}$ and the torque due to the reflected inertia accelerations seen by the driveline ($T_{DRIVELINE—INERTIA—N}$) with the difference being appropriately reflected to point M. Thus, $T_M$ is determined by the equation:

$$T_M = (T_{TORQUE—CONVERTER—OUT} - T_{DRIVELINE—INERTIA—N}) (GR_{MN}) (EFF_{MN})$$

Equation 8 where $GR_{MN}$ is the total gear reduction between the torque converter and point M and $EFF_{MN}$ is an efficiency term. In one embodiment, $GR_{MN}$ and $EFF_{MN}$ are predetermined constants based on the location of point M and the current gear (N) ratio of the transmission 214. In another embodiment, $EFF_{MN}$ is a calculated function of torque and speed.

If the torque converter lock-up clutch is locked, then no slippage across the torque converter occurs and the torque at the torque converter output ($T_{TORQUE—CONVERTER—OUT}$) is equal to the engine output torque (multiplied by an efficiency term).

$T_{DRIVELINE—INERTIA—N}$ is the torque due to accelerating inertia seen by the driveline and is determined by the equation:

$$T_{DRIVELINE—INERTIA—N} = I_{MN} \cdot ACCELERATION$$

Equation 9 where $I_{MN}$ is a calculation based on predetermined lumped inertia constants and gear reductions. ACCELERATION is the rotational acceleration of the engine output shaft (as determined by taking the second derivative of SPEED).

In the preferred embodiment, $I_{MN}$ is determined by the equation:

$$I_{MN} = I_0 + \sum_{i=1}^{k} I_i [(x_i)!]^2.$$

Equation 10 where $I_0$ is the first lumped inertia value coincident with the engine output, $I_i$ are the lumped rotating inertias, and $X_i$ are the various gear reductions between the engine output and point M with k number of individual gearset reductions.

If the torque converter clutch is slipping, the torque converter output torque is no longer equivalent to engine torque and is calculated by the following equation:

$$T_{TORQUE—CONVERTER—OUT} = (SPEED_{TORQUE—CONVERTER—INPUT}/C)^2 \cdot (T_P) \cdot (TR)$$

Equation 11 where $T_P$ and TR are characteristics of the torque converter and are preferably determined via table look-up functions based on the torque converter speed ratio ($SPEED_{TORQUE—CONVERTER—OUT}/SPEED_{TORQUE—CONVERTER—IN}$).

$SPEED_{TORQUE—CONVERTER—IN}$ is equal to engine speed and $SPEED_{TORQUE—CONVERTER—OUT}$ is obtained from the torque converter output speed sensor 156. C is a predetermined constant.

When the torque converter is slipping, torque at a point downstream of the torque converter is calculated using Equation 9, where acceleration is determined by the second derivative of torque converter output speed.

Equations 8–11 form the basis for computing a torque value at any point on the driveline between the engine and driven wheels.

However, if point M is downstream of the bevel gear differential input, then division of the torque between the first and second wheels by the bevel gear differential must be taken into account. In one embodiment, a conventional open differential, for example, is used and it is assumed that the division is substantially equal. In other embodiment for example for a limited slip differential, the division is determined as a function of other driveline parameters.

Industrial Applicability

With reference to the drawings and in operation, the present invention provides a method for determining an estimate of a torque of a driveline at a point M using a computer based model. This allows an accurate measurement of various torques along the driveline 108 without requiring an actual shaft torque sensor.

The method includes the steps of sensing a plurality of parameters of the engine 102 or driveline 108 in realtime during machine operation and responsively producing a plurality of respective parameter signals and receiving the parameter signals, determining a modeled value of the torque, and responsively producing a torque signal (see above).

The onboard realtime torque values may be used for a variety of purposes including diagnostics and control purposes. To that end, the torque signal may be treated in several different ways.

For example, the torque signal (which is preferably in digital form) may be stored as a series of values versus time similar to that which would be received from a torque sensor.

The torque signal may also be stored as a histogram. In other words, the possible range of values for the torque signal would be broken down into a number of predetermined ranges. The number of times that the torque signal is within a particular range is counted and stored.

Other aspects, objects, and advantages of this invention can be obtained from a study of the drawings, the disclosure, and the appended claims.

I claim:

1. A method of determining an estimate of a torque of a powertrain at a point M using a computer based model, the powertrain including a driveline and an engine, comprising the steps of:

sensing a plurality of parameters of the powertrain in real-time during operation and responsively producing a plurality of respective parameter signals; and, receiving the parameter signals, determining a modeled value of the torque at an arbitrary point M on the driveline, and responsively producing a torque signal, wherein the step of determining a modeled value of the torque includes the steps of:

calculating a modeled value of a brake power and responsively producing a brake power signal;

receiving the brake power signal, determining an engine output torque as a function of the brake power signal and responsively producing an engine output torque signal;

receiving the engine output torque signal, determining a torque converter output torque as a function of the engine output torque signal, and responsively producing a torque converter output torque signal; and, wherein the modeled value of the torque is a function of the engine output torque.

2. A method, as set forth in claim 1, wherein said step of determining a modeled value of the torque at point M includes the step of determining an estimate of the torque due to an inertia seen by the driveline at point M and wherein said modeled value is a function of said driveline inertia torque.

3. A method, as set forth in claim 2, wherein the estimate of the torque of the driveline at point M ($T_M$) is determined by the equation:

$$T_M = (T_{TORQUE-CONVERTER-OUT} - T_{DRIVELINE-INERTIA-N}) (GR_{MN}) (EFF_{MN})$$

where, $T_{TORQUE-CONVERTER-OUT}$ is the torque converter output torque, $T_{DRIVELINE-INERTIA-N}$ is the driveline inertia torque, $GR_{MN}$ is a total gear reduction from the engine to point M, $EFF_{MN}$ is an efficiency term.

4. A method of determining an estimate of a torque of a powertrain at a point M using a computer based model, the powertrain including a driveline and an engine, comprising the steps of:

sensing a plurality of parameters of the powertrain in real-time during operation and responsively producing a plurality of respective parameter signals; and receiving the parameter signals, determining a modeled value of the torque at an arbitrary point M on the driveline, and responsively producing a torque signal, wherein the step of determining a modeled value of the torque includes the steps of:

sensing torque converter input speed and responsively producing a torque converter input speed signal;

sensing torque converter output speed and responsively producing a torque converter output speed signal; and receiving the torque converter input and output speed signals, determining an estimate of a torque converter output torque, and determining an estimate of the torque of the driveline at the point M ($T_M$) by the equation:

$$T_M = (T_{TORQUE-CONVERTER-OUT} - T_{DRIVELINE-INERTIA-N}) (GR_{MN}) (EFF_{MN})$$

where, $T_{TORQUE-CONVERTER-OUT}$ is the torque converter output torque, $T_{DRIVELINE-INERTIA-N}$ is the driveline inertia torque, $GR_{MN}$ is a total gear reduction from the engine to point M, and $EFF_{MN}$ is an efficiency term.

* * * * *